United States Patent
Jung et al.

(10) Patent No.: US 12,409,708 B2
(45) Date of Patent: Sep. 9, 2025

(54) INTEGRATED DEVICE OF PUMP AND VALVE

(71) Applicants: Hyundai Motor Company, Seoul (KR); Kia Corporation, Seoul (KR); GMB Korea Corp., Changwon-si (KR)

(72) Inventors: Ji Woong Jung, Anyang-si (KR); Seung Woo Yang, Goyang-si (KR); Gun Goo Lee, Suwon-si (KR); Kyung Hwan Kim, Incheon (KR); Chang Hyun Park, Hwaseong-si (KR); Jae Sung Bae, Anyang-si (KR)

(73) Assignees: Hyundai Motor Company, Seoul (KR); Kia Corporation, Seoul (KR); GMB Korea Corp., Changwon-si (KR)

( * ) Notice: Subject to any disclaimer, the term of this patent is extended or adjusted under 35 U.S.C. 154(b) by 307 days.

(21) Appl. No.: 18/085,124

(22) Filed: Dec. 20, 2022

(65) Prior Publication Data

US 2023/0398838 A1    Dec. 14, 2023

(30) Foreign Application Priority Data

Jun. 9, 2022 (KR) .................. 10-2022-0070133

(51) Int. Cl.
*B60H 1/32* (2006.01)
*B60H 1/00* (2006.01)

(52) U.S. Cl.
CPC ........... *B60H 1/32* (2013.01); *B60H 1/00278* (2013.01); *B60H 2001/00307* (2013.01); *B60H 2001/3286* (2013.01)

(58) Field of Classification Search
CPC .. B60H 1/00278; B60H 1/00485; B60H 1/32; B60H 1/32284; B60H 2001/00307; B60H 2001/3286

See application file for complete search history.

(56) References Cited

U.S. PATENT DOCUMENTS

| 2016/0318370 | A1* | 11/2016 | Rawlinson | ......... B60H 1/32281 |
| 2017/0071442 | A1* | 3/2017 | Boyer | .................. F16K 11/074 |
| 2019/0136724 | A1 | 5/2019 | Wong | |

FOREIGN PATENT DOCUMENTS

| KR | 1020180008953 A | | 1/2018 |
| KR | 1020180039973 A | | 4/2018 |
| KR | 102140658 | * | 8/2020 |
| KR | 102140658 B1 | | 8/2020 |
| KR | 1020210099407 A | | 8/2021 |

OTHER PUBLICATIONS

KR 102 140 658 xlation.pdf published 2020.*

* cited by examiner

*Primary Examiner* — Henry T Crenshaw
(74) *Attorney, Agent, or Firm* — Fish & Richardson P.C.

(57) ABSTRACT

An integrated device of a pump and a valve is disclosed. The integrated device of a pump and a valve includes a drive unit, a valve assembly mounted on the drive unit and configured to be switchable to a first position or a second position by the drive unit, a pump mounted on the drive unit, and a controller configured to control operation of the drive unit and the pump. The valve assembly includes a plurality of inlets and a plurality of outlets. At the first position and the second position of the valve assembly, different fluid passages are formed in the valve assembly. The pump is configured to communicate with the valve assembly to allow a flow of fluid through the valve assembly.

18 Claims, 15 Drawing Sheets

INTEGRATED DEVICE OF PUMP AND VALVE

CROSS REFERENCE TO RELATED APPLICATION

The present application claims priority to Korean Patent Application No. 10-2022-0070133, filed Jun. 9, 2022, the entire contents of which are incorporated herein by reference for all purposes.

TECHNICAL FIELD

The present disclosure relates to an integrated device of a pump and a valve in which a pump and a valve are integrated with each other. More particularly, the present disclosure relates to an integrated device of a pump and a valve, and to a cooling water circulation system including the same.

BACKGROUND

An electric vehicle is a vehicle driven entirely or partially by a motor and is receiving a lot of attention due to its environmental friendliness. An electric vehicle includes a rechargeable battery that stores energy to be supplied to the motor.

Since the performance of a battery can be greatly affected by temperature, an electric vehicle typically includes a temperature control system for the battery. The temperature control for the battery can be performed through an air cooling method, a water cooling method, or the like.

Recently, as an increase in a driving distance on a full charge of an electric vehicle is required, the battery is becoming more sophisticated. Traditionally, the air cooling method was mainly used to control the temperature of the battery. However, as the battery becomes more sophisticated, there is a trend to change to a water cooling method.

SUMMARY

An objective of the present disclosure is to provide an integrated device of a pump and a valve that can simplify the cooling loop of a battery.

Another objective of the present disclosure is to provide an integrated device of a pump and a valve capable of reducing the costs by omitting parts.

The objectives of the present disclosure are not limited to those mentioned above, and other objects not mentioned will be clearly understood by those skilled in the related art from the following description.

In order to achieve the objectives of the present disclosure as described above and perform the characteristic functions of the present disclosure to be described later, the features of the present disclosure are as follows.

According to some implementations described in the present disclosure, there is provided an integrated device of a pump and a valve. The integrated device of a pump and a valve includes a drive unit, a valve unit mounted on the drive unit and configured to switch between a first position and a second position by the drive unit, a pump unit mounted on the drive unit, and a controller configured to control operation of the drive unit and the pump unit. The valve unit includes a plurality of inlets and a plurality of outlets. At the first position and the second position of the valve unit, different fluid passages are formed in the valve unit. The pump unit is configured to communicate with the valve unit to allow a flow of fluid through the valve unit.

According to some implementations described in the present disclosure, there is provided a cooling water circulation system. The cooling water circulation system includes a first cooling loop and a second cooling loop configured to circulate a coolant. The integrated device of a pump and a valve is disposed between the first and the second cooling loops and is switchable between the first position and the second position, thus forming different fluid passages between the first and the second cooling loops. The controller is configured to control the integrated device of a pump and a valve to be placed in the first or the second position based on a preset condition.

According to the present disclosure, the integrated device of a pump and a valve enabling a simplified cooling loop configuration is provided.

According to the present disclosure, the integrated device of a pump and a valve that provides weight and cost reduction effects is provided.

The effects of the present disclosure are not limited to those mentioned above, and other effects not mentioned will be clearly understood by those skilled in the related art from the following description.

DETAILED DESCRIPTION

Specific structural or functional descriptions presented in the implementations of the present disclosure are only exemplified for the purpose of describing implementations according to the concept of the present disclosure, and the implementations according to the concept of the present disclosure may be implemented in various forms. In addition, it should not be construed as being limited to the implementations described herein, and should be understood to include all modifications, equivalents, and substitutes included in the spirit and scope of the present disclosure.

Hereinafter, preferred implementations of the present disclosure will be described in detail with reference to the accompanying drawings.

Figure 1A:
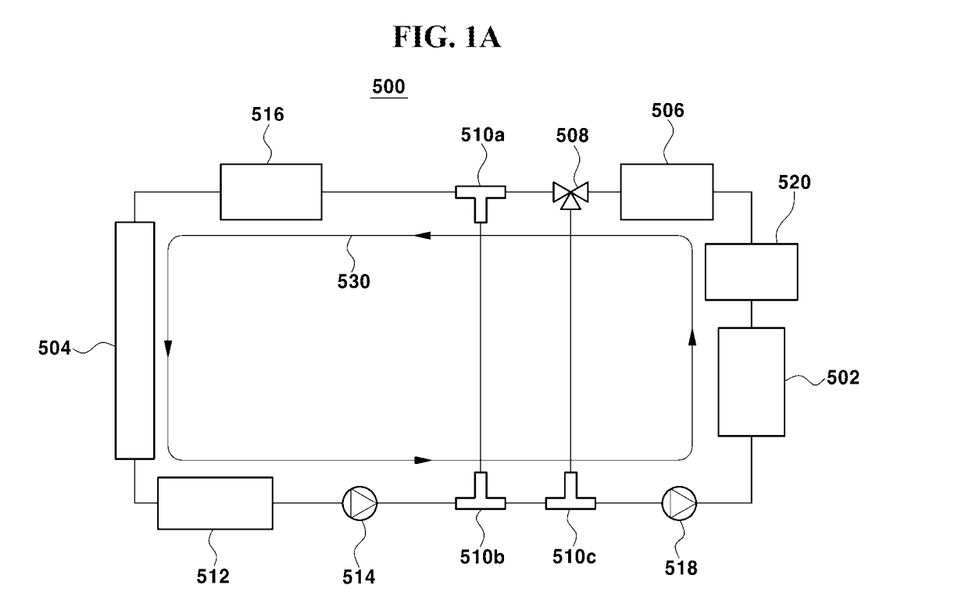
FIG. 1A shows a schematic diagram illustrating an example cooling mode for cooling a battery.
Figure 1B:
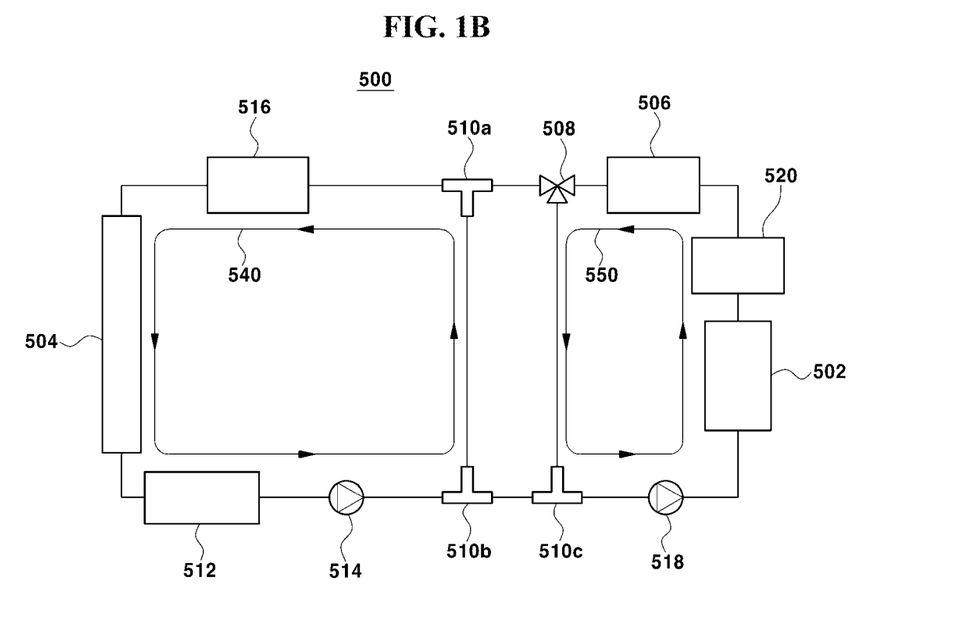
FIG. 1B shows a schematic diagram illustrating another example cooling mode for cooling the battery.

FIGS. 1A and 1B show an exemplary, water-cooled battery cooling system 500. Cooling of a battery 502 in the cooling system 500 may be accomplished using a radiator 504 or a battery chiller 506. To this end, an integrated cooling mode through the radiator 504 and a separate cooling mode through the battery chiller 506 using a three-way valve 508 and three T-shaped branch pipes 510a, 510b, 510c can be executed.

FIG. 1A shows an integrated cooling loop 530 for an integrated cooling mode. A coolant stored in a reservoir tank 512 starts circulation in the integrated cooling loop 530 by a water pump 514. The coolant that has cooled the battery 502 exchanges heat in the radiator 504. The coolant continues to circulate in the integrated cooling loop 530 and exchanges heat with the battery 502.

Two separate loops are configured in the separate cooling mode of FIG. 1B. In a radiator loop 540, the coolant circulates through the reservoir tank 512, the water pump 514, a water-cooled condenser 516 and the radiator 504. The coolant in a chiller loop 550 is configured to circulate the battery 502 and the battery chiller 506 by a water pump 518. Reference numeral 520 indicates a heater for increasing the temperature of the battery 502. Here, the radiator loop 540 may be configured to cool other cooling subjects, such as power conversion parts.

In order to enable the integrated cooling mode and the separate cooling mode as described above, the three-way valve 508 and three T-shaped branch pipes 510a, 510b, 510c are used. In some vehicles, an integrated branch pipe in which three T-shaped branch pipes 510a, 510b, 510c are integrated into a single body is used.

In this example cooling system 500, the three-way valve 508, three or more T-shaped branch pipes 510a, 510b, 510c, or an integrated branch pipe should be included. Also, the water pumps 514 and 518 should be provided separately. Therefore, a number of parts should be included, and the configuration of the flow path can be complicated.

Accordingly, the present disclosure describes the integrated device of a pump and a valve in which a water pump and a valve are integrated and helps enable a simplified design of a flow path including the same. According to the present disclosure, since the three T-shaped branch pipes 510a, 510b, 510c or the integrated branch pipe can be omitted, the number of parts can be reduced and a connection path can be simplified, thereby reducing weight and cost, for instance.

Figure 2:
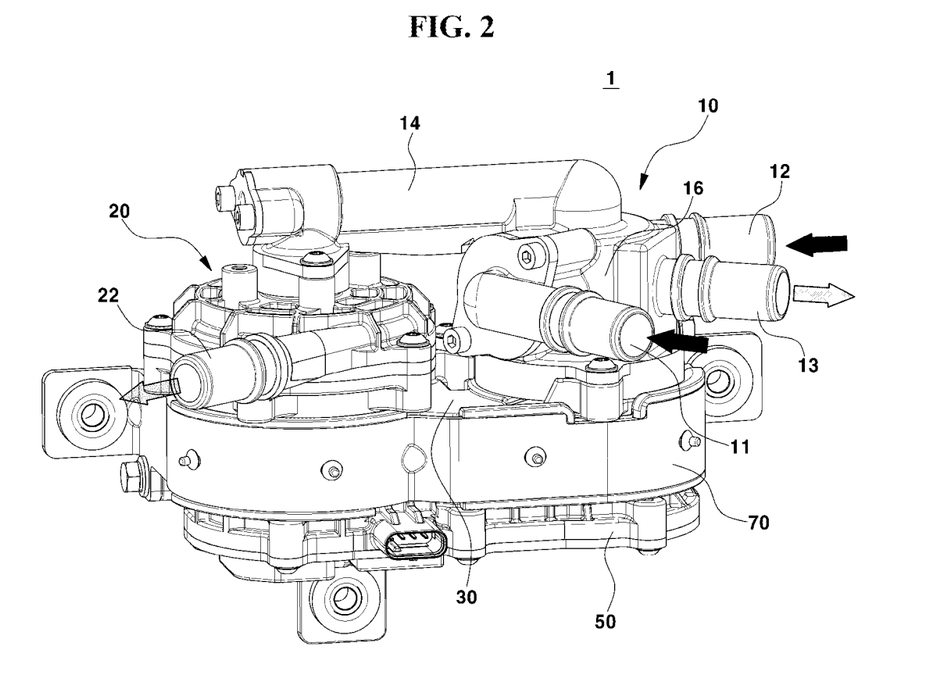
FIG. 2 shows a perspective view of an example integrated device of a pump and a valve according to an implementation described in the present disclosure.
Figure 3:
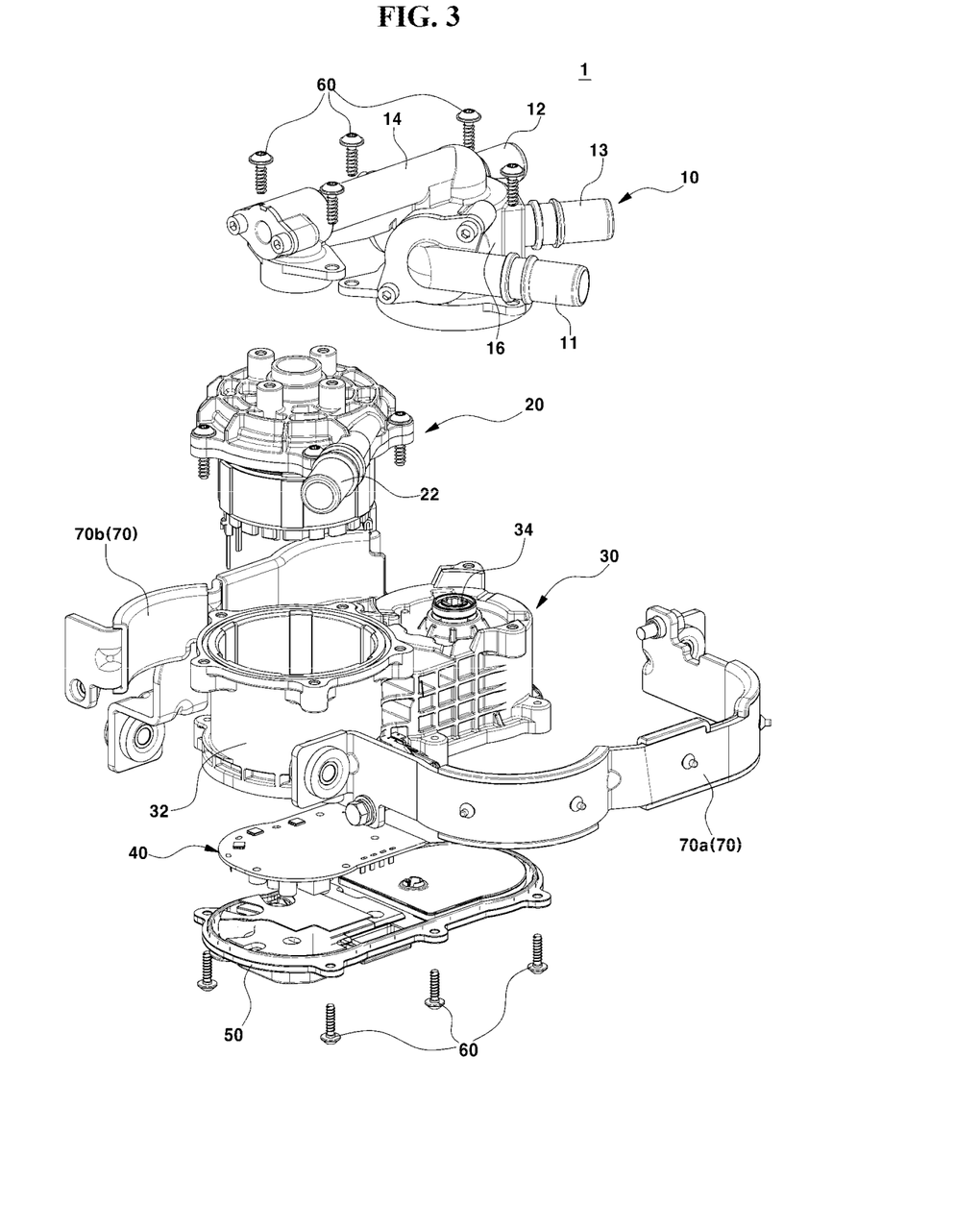
FIG. 3 is an exploded perspective view of FIG. 2.

According to the integrated device 1 of a pump and a valve according to the present disclosure with reference to FIGS. 2 to 3, a four-way valve is used instead of a three-way valve, and the four-way valve and one water pump are integrated. To this end, the integrated device 1 of a pump and a valve according to the present disclosure includes a valve unit 10, a pump unit 20, a drive unit 30, and a controller 40.

The valve unit 10 includes two inlets 11, 12, one outlet 13 and a communication passage 14. The coolant may be introduced into the valve unit 10 through the two inlets, the first inlet 11 and the second inlet 12, The coolant may be discharged from the valve unit 10 through the outlet 13 and the communication passage 14.

The valve unit 10 includes a valve housing 16 in which a valve 15 is accommodated. The inlets 11, 12, the outlet 13 and the communication passage 14 may be formed into a single unit with the valve housing 16 or may be formed separately and detachably coupled to the valve housing 16 through bolts or the like.

Figure 4A:
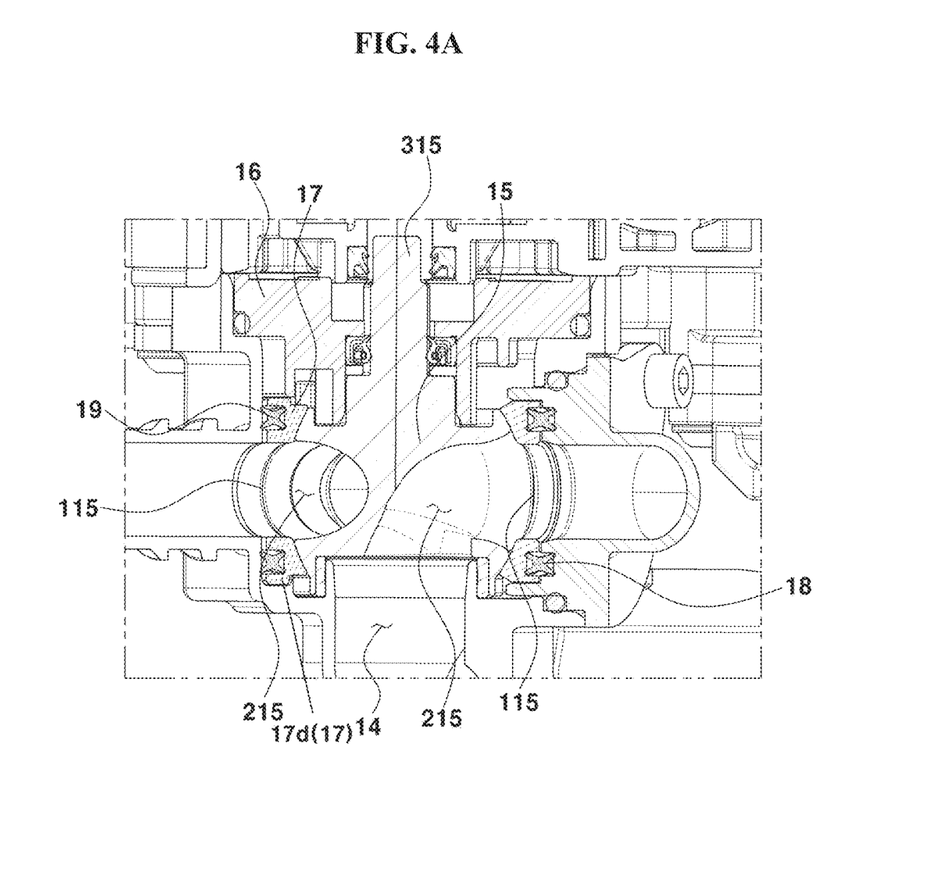
FIG. 4A is a first direction sectional view of the example valve provided in the integrated device of a pump and a valve according to an implementation described in the present disclosure.

As shown in FIG. 4A, the valve 15 forms a flow path for the coolant introduced through the inlets 11 and 12. In some cooling modes, the valve 15 may communicate the first inlet 11 and the outlet 13 and the second inlet 12 and the communication passage 14 in communication. In addition, in some cooling modes, the valve 15 may be changed the position to communicate the first inlet 11 and the communication passage 14, and to communicate the second inlet 12 and the outlet 13. As a non-limiting example, the valve 15 may be a ball valve.

The valve 15 can be positioned in a first position and a second position through rotation. In the first position, the first inlet 11 and the outlet 13 may communicate with each oipther. At the same time, the second inlet 12 and the communication passage 14 may communicate with each other. In the second position, the first inlet 11 and the communication passage 14 may communicate with each other. At the same time, the second inlet 12 and the outlet 13 may communicate with each other. To this end, the valve 15 includes four openings 115, of which two openings 115 are configured to communicate with each other and the other two openings 115 to communicate with each other. In other words, two passages 215 are provided in the valve 15.

Figure 4B:
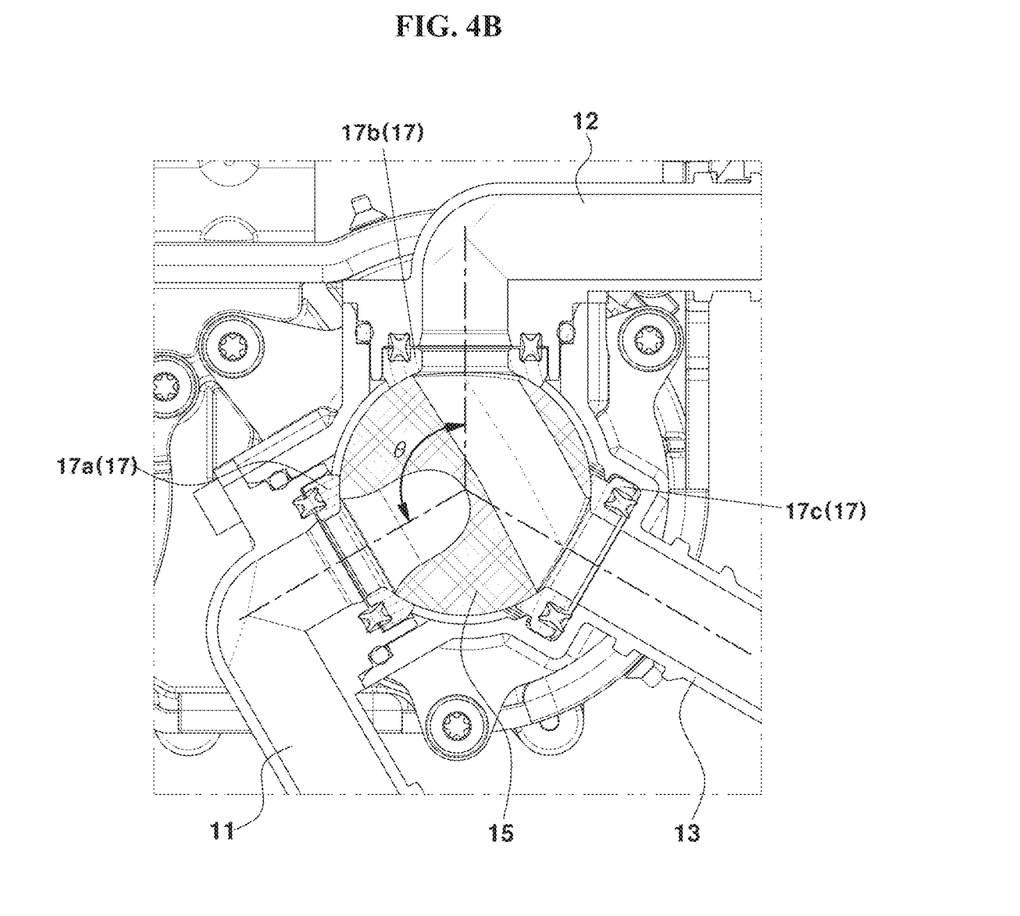
FIG. 4B is a second direction sectional view of the example integrated device of a pump and a valve, where the first direction and the second direction are perpendicular to each other.

Referring to FIG. 4B, the angles θ between the inlets 11 and 12, the outlet 13 and the communication passage 14 are arranged to form obtuse angles therebetween. By the angles θ being obtuse angles, when the opening 115 of the valve 15 is aligned with the inlet 11 (or inlet 12) and the outlet 13 (or the connection passage 14), the coolant can flow along the two passages 215. In addition, the two passages 215 extend curvedly in the valve 15. The two passages 215 configured to be curved within the valve 15 can reduce the flow resistance that occurs when the coolant introduced through the inlets 11 and 12 is sharply bent toward the outlet 13 or the communication passage 14. Since the inlets 11, 12, the outlet 13, and the communication passage 14 are spaced apart from each other to form obtuse angles therebetween, and the two passages 215 curvedly extend in the valve 15, the flow resistance of coolant introduced through the openings 115 can be reduced.

Figure 4C:
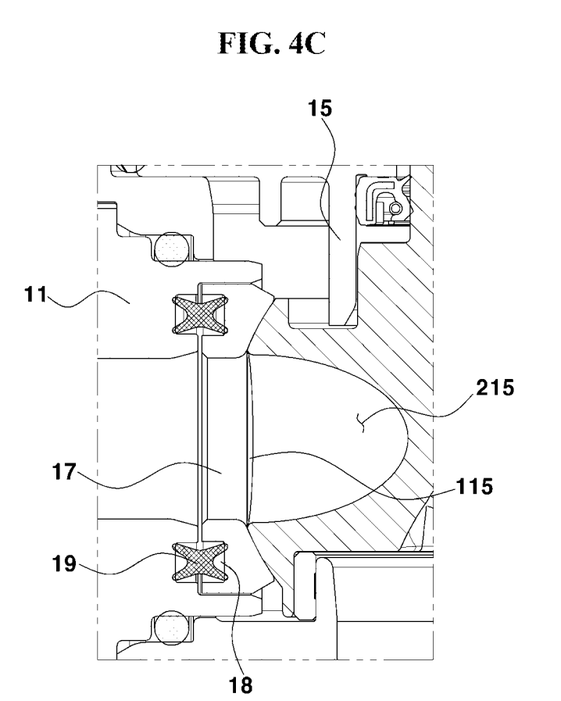
FIG. 4C is a partially enlarged view of the example integrated device of a pump and a valve according to an implementation described in the present disclosure.

As shown in FIG. 4C, the valve housing 16 is provided with a sealing member 17. The sealing member 17 prevents the coolant from leaking through the gap when the coolant flows. For instance, as shown in FIGS. 4A and 4B, a first seal 17a is disposed between the first inlet 11 and the valve 15, a second seal 17b is disposed between the second inlet 12 and the valve 15, a third seal 17c is disposed between the first outlet 11 and the valve 15, and a fourth seal 17d is disposed between the second outlet 12 and the valve 15. For example, when the first inlet 11 is aligned with one of the openings 115 of the valve 15, the flowing coolant does not leak to the outside. Further, according to the present disclosure, the ring member 19 is mounted between each sealing member 17 and each inlet 11, 12, the outlet 13 and the communication passage 14. The ring member 19 may provide an additional seal between elements. As a non-limiting example, the ring member 19 may be X-rings having an X-shaped cross-section. The ring member 19 may seal gaps formed between each groove 18 and the valve housing 16, more specifically, a groove and inlets 11, 12, a groove and the outlet 13 and a groove and the communication passage 14.

The pump unit 20 is communicated to the valve unit 10. In particular, the pump unit 20 is connected to the communication passage 14, and the coolant flowing in through the valve unit 10 may be discharged through an outlet port 22 of the pump unit 20.

The drive unit 30 switches the position of the valve 15 of the valve unit 10 and allows the pump unit mounted on the drive unit 30 to operate. In some implementations, the drive unit 30 includes a holder portion 32 operably accommodating the pump unit 20. In addition, the valve unit 10 is coupled to the drive unit 30. In particular, the drive unit 30 is coupled to a shaft portion 315 of the valve 15 for switching the position of the valve 15. Specifically, the drive unit 30 has a shaft connection portion 34 adjoining the holder portion 32 to rotatably connect the shaft portion 315.

Figure 5A:
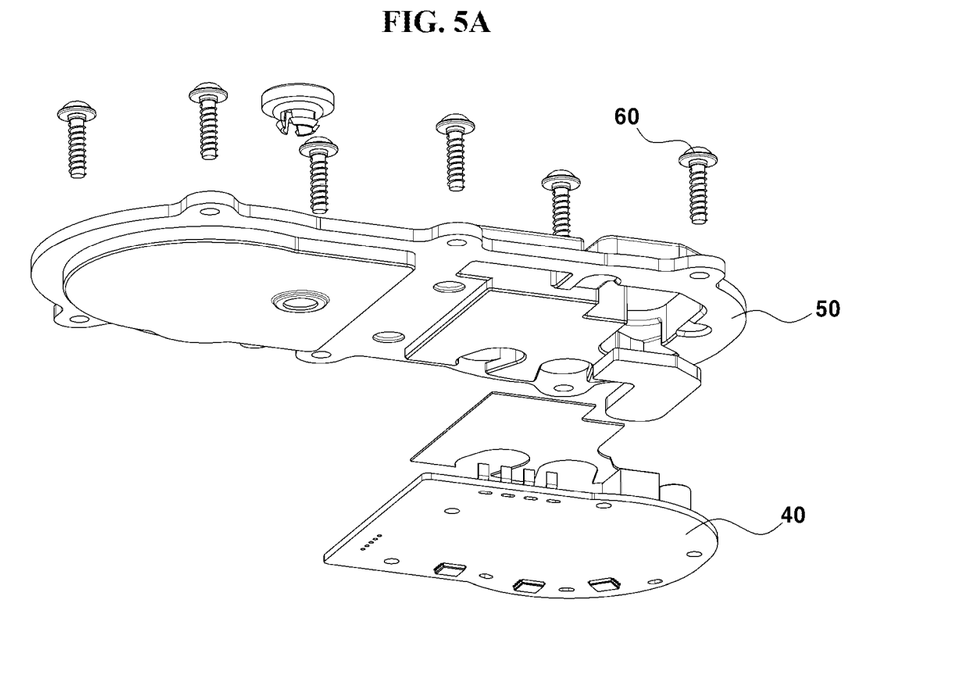
FIG. 5A is an exploded perspective view of an example controller part of the integrated device of a pump and a valve according to an implementation described in the present disclosure
Figure 5B:
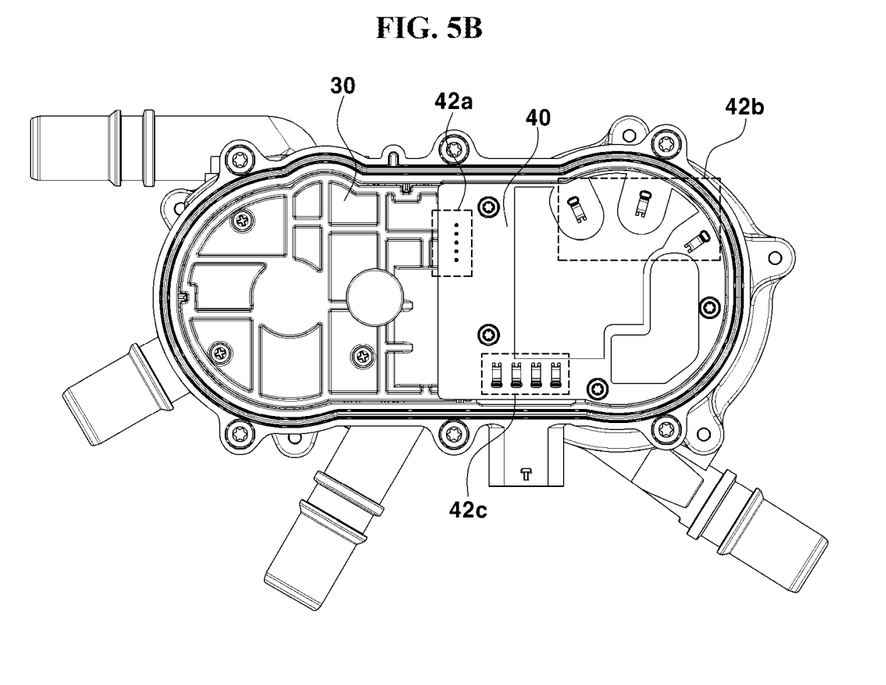
FIG. 5B shows a bottom view of the example controller of the integrated device of a pump and a valve according to an implementation described in the present disclosure.

Referring to FIGS. 5A and 5B, the controller 40 is configured to provide a control signal to the pump unit 20 and the drive unit 30. According to an implementation described in the present disclosure, the controller 40 may be mounted on the drive unit 30. As a non-limiting example, the controller 40 may be a printed circuit board mounted under the drive unit 30.

The controller 40 is electrically connected to the pump unit 20 and the drive unit 30. In addition, the controller 40 is configured to control switching of the position of the valve unit 10 and the pumping of the pump unit 20 based on a required circulation rate of the coolant, a direction of the flow of the coolant, a flow rate of the coolant, a temperature of the coolant, and the like. For example, the controller 40 is configured to communicate with a flow sensor, a water temperature sensor, and the like, installed on a flow passage in which the integrated device 1 of a pump and a valve is disposed. The controller may control the pump unit 20 and the valve unit 10 based on the measured values collected from the sensors.

The controller 40 may include a plurality of terminals 42a, 42b, 42c to be electrically connected to the drive unit 30, a connector, and the pump unit 20. According to the present disclosure, both the drive unit 30 and the pump unit 20 may be controlled by a single controller 40.

The controller 40 may rotate the valve 15 by controlling the angle of the drive unit 30 to change the direction of the coolant flow. When the integrated cooling mode or the separate cooling mode is required, the position of the valve 15 can be switched for each required mode. In addition, the controller 40 is configured to control the rotation number, e.g., rotations per minute (RPM), of the pump unit 20. The controller 40 may operate the pump unit 20 at a certain RPM based on the required flow rate of coolant.

A casing 50 is coupled to the drive unit 30. In particular, the casing 50 is coupled to the drive unit 30 such that the controller 40 is encased and protected. The casing 50 may be coupled to the drive unit 30 with fastening members 60, such as bolts.

The integrated device 1 of a pump and a valve according to the present disclosure may further include a bracket 70. The bracket 70 holds the integrated device 1 of a pump and a valve and allows it to be mounted on a mounting target. In some implementations of the present disclosure, a pair of brackets 70a, 70b facing each other may be coupled to the integrated device 1 to surround the drive unit 30.

Hereinafter, the operation of the integrated device 1 of a pump and a valve according to the present disclosure will be described. FIGS. 6A to 6C and FIGS. 7A to 7C show the integrated cooling mode and the separate cooling mode, respectively.

Figure 6A:
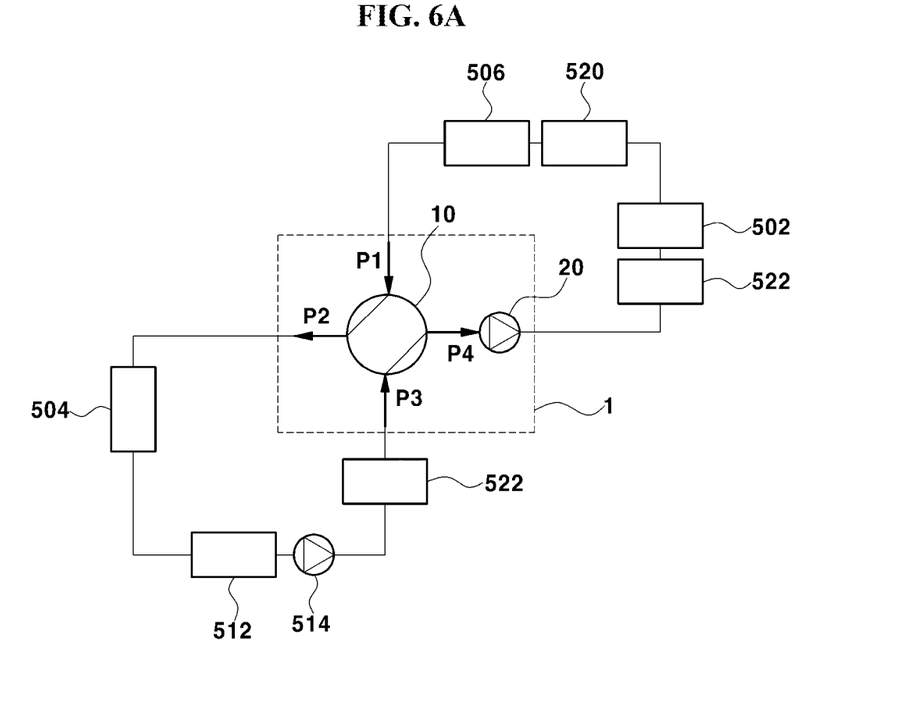
FIG. 6A to 6C are views illustrating an example flow path according to an integrated cooling mode of the integrated device of a pump and a valve according to an implementation described in the present disclosure.
Figure 6B:
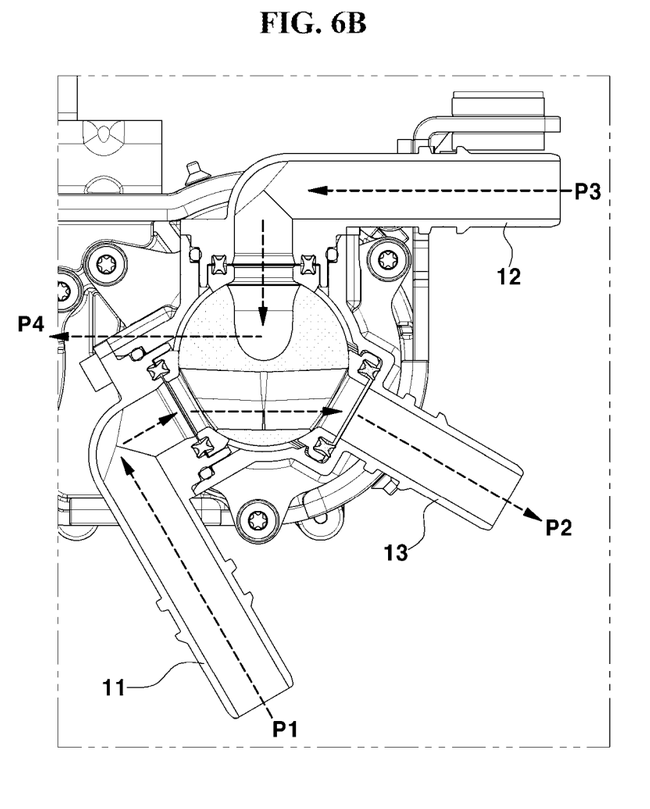
Figure 6C:
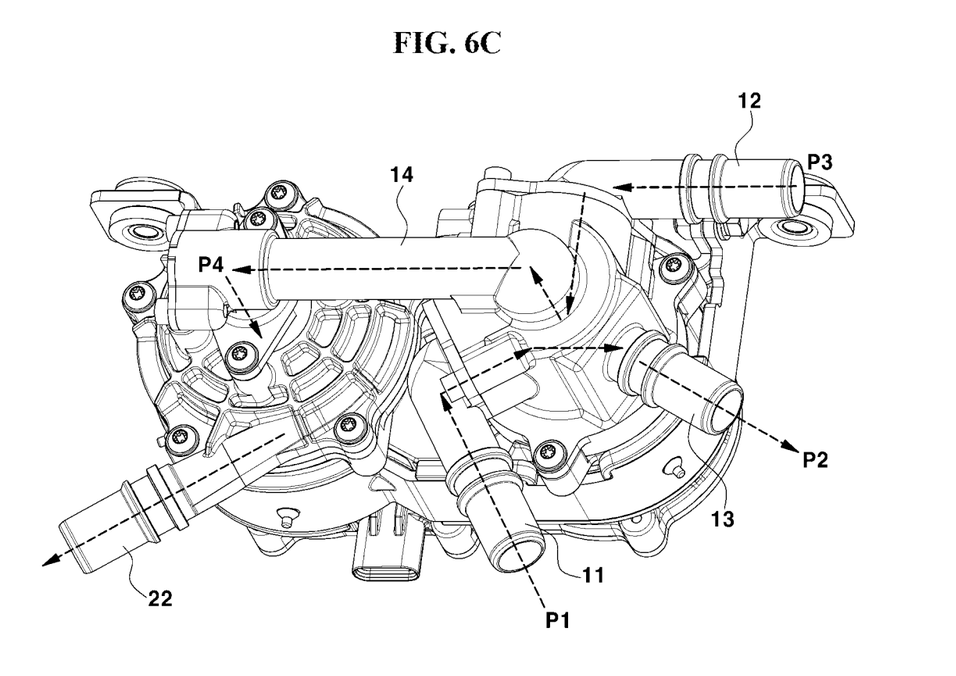

As depicted in FIGS. 6A to 6C, the integrated device 1 of a pump and a valve according to the present disclosure may cool the battery 502 by the integrated cooling mode. When the integrated cooling mode is requested, the controller 40 commands the drive unit 30 to position the valve 15 in the first position. In the first position of the valve 15, the first inlet 11 and the outlet 13 communicate with each other (P1-P2). At the same time, the second inlet 12 and the discharge port 22 communicate with each other, i.e., through the connection passage 14 (P3-P4). In addition, the controller 40 operates the pump unit 20 at a predetermined RPM so that the coolant exchanged heat with the radiator 504 cools the battery 502.

Figure 7A:
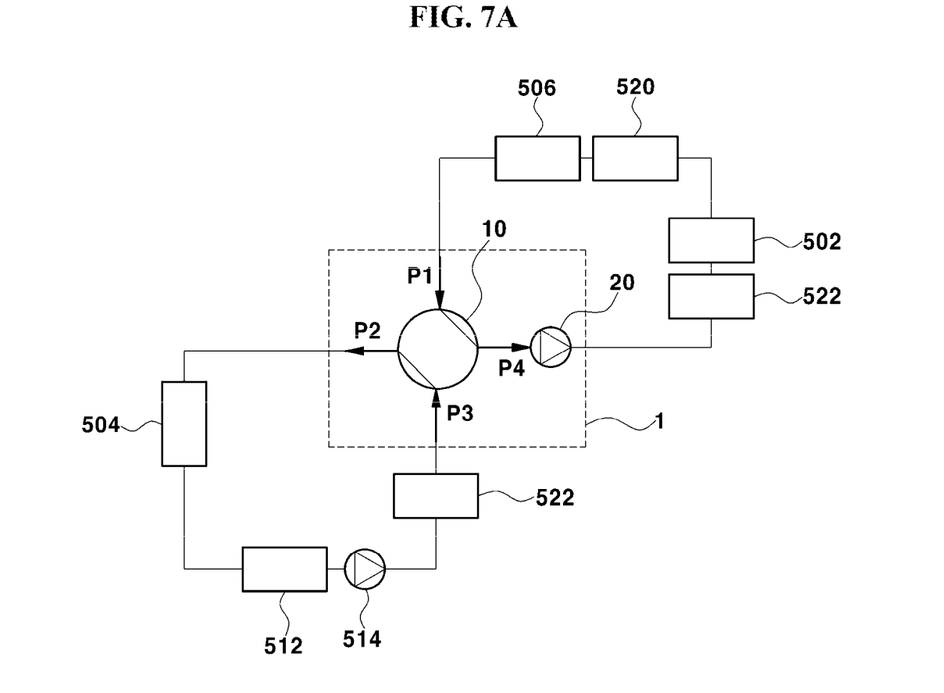
FIG. 7A to 7C are views illustrating an example flow path according to another cooling mode of the integrated device of a pump and a valve according to an implementation described in the present disclosure.
Figure 7B:
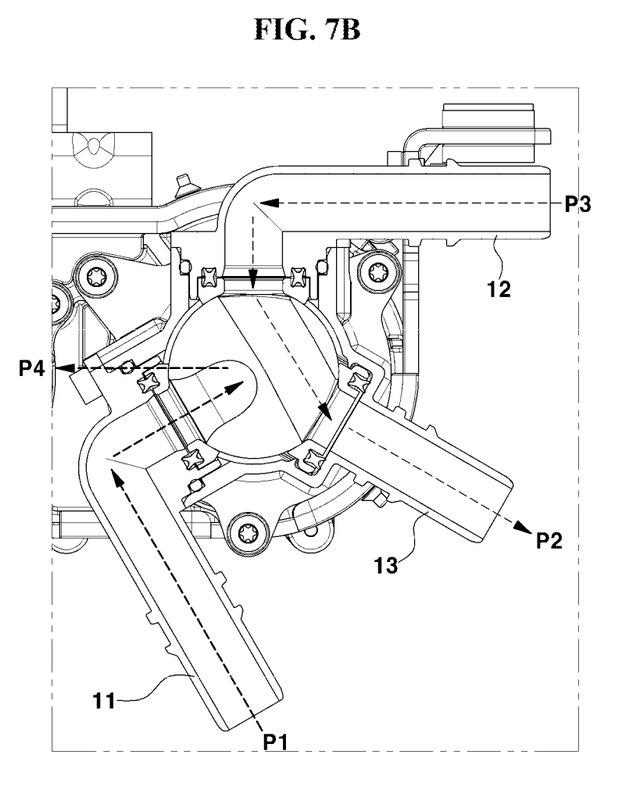
Figure 7C:
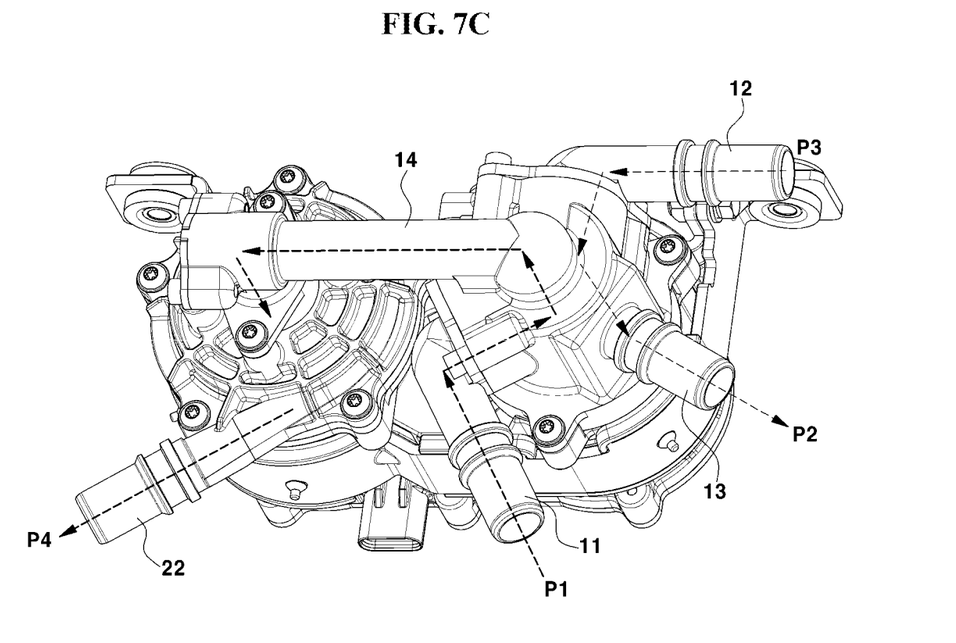

As shown in FIGS. 7A to 7C, the integrated device 1 of a pump and a valve can cool the battery 502 in a separate cooling mode. In the separate cooling mode, two separate cooling loops are configured. In the separate cooling mode, the first inlet 11 communicates with the discharge port 22 (P1-P4), and the second inlet 12 communicates with the outlet 13 (P2-P3). To this end, the controller 40 rotates the drive unit 30 so that the valve 15 is positioned in the second position.

According to the present disclosure, it is possible to reduce the cost and compact the package by eliminating the T-shaped branch pipe, hose, and the like. In addition, the present disclosure may reduce the hydraulic power loss through the simplification of the flow passage.

Although the present disclosure was described with reference to specific implementations shown in the drawings, it is apparent to those skilled in the art that the present disclosure may be changed and modified in various ways without departing from the scope of the present disclosure, which is described in the following claims.

What is claimed is:

1. A cooling device comprising:
   a motor;
   a valve unit configured to switch between a first position and a second position by the motor, the valve unit having a plurality of inlets and a plurality of outlets, wherein different fluid passages are formed in the valve unit in the first position and the second position, respectively;
   a pump in fluid communication with the valve unit and configured to circulate a fluid through the valve unit; and
   a controller configured to control the motor and the pump, wherein the motor comprises a holder portion configured to accommodate the pump therein.

2. The cooling device of claim 1, wherein the plurality of inlets comprises a first inlet and a second inlet, and the plurality of outlets comprises a first outlet and a second outlet,
   wherein in the first position, (i) a fluid passage is formed between the first inlet and the first outlet, and (ii) a fluid passage is formed between the second inlet and the second outlet, and
   wherein in the second position, (i) a fluid passage is formed between the first inlet and the second outlet, and (i) a fluid passage is formed between the second inlet and the first outlet.

3. The cooling device of claim 2, wherein the fluid passing through the second outlet is discharged through the pump.

4. The cooling device of claim 3, wherein the second outlet comprises a communication passage and a discharge port,
wherein the communication passage is configured to provide fluid communication between the valve unit and the pump, and
wherein the discharge port is in fluid communication with the communication passage and configured to discharge the fluid passing through the pump.

5. The cooling device of claim 2, wherein the first inlet, the second inlet, the first outlet, and the second outlet are arranged in the valve unit to form obtuse angles with each other.

6. The cooling device of claim 1, wherein the valve unit comprises:
a valve housing; and
a valve rotatably provided inside the valve housing to rotate between the first position and the second position.

7. The cooling device of claim 6, wherein the valve comprises a first passage and a second passage, and
wherein the first passage and the second passage have curved shapes within the valve.

8. The cooling device of claim 6, wherein the valve unit further comprises:
a shaft portion extending from the valve,
wherein the shaft portion is connected to a shaft connection portion of the motor that is configured to rotate the shaft portion to switch a position of the valve.

9. The cooling device of claim 6, wherein the plurality of inlets comprises a first inlet and a second inlet, and the plurality of outlets comprises a first outlet and a second outlet,
wherein a plurality of seals are mounted in the valve housing, the plurality of seals comprising first to fourth seals, and
wherein the first seal is disposed between the first inlet and the valve, the second seal is disposed between the second inlet and the valve, the third seal is disposed between the first outlet and the valve, and the fourth seal is disposed between the second outlet and the valve.

10. The cooling device of claim 9, wherein ring members are interposed between the first seal and the first inlet, between the second seal and the second inlet, between the third seal and the first outlet, and between the fourth seal and the second outlet, respectively.

11. The cooling device of claim 10, wherein each of the ring members has an X-shaped cross section.

12. The cooling device of claim 1, further comprising a bracket mounted to the motor to surround the motor.

13. The cooling device of claim 1, wherein the controller is mounted to the motor.

14. The cooling device of claim 13, further comprising a casing mounted to the motor and configured to protect the controller.

15. The cooling device of claim 1, wherein the controller comprises a plurality of terminals configured to provide connection with the motor and the pump.

16. A cooling system comprising:
a first cooling loop and a second cooling loop configured to circulate a coolant;
an integrated device having a pump and a valve, the integrated device being disposed between the first and second cooling loops and being switchable between a first position and a second position that form different fluid passages between the first and second cooling loops; and
a controller configured to control the integrated device to be placed in the first position or the second position based on a preset condition, wherein the preset condition includes one or more of a flow rate and a temperature of the coolant.

17. The cooling system of claim 16, wherein in the first position, the first cooling loop and the second cooling loop communicate with each other via the integrated device, and
wherein in the second position, the first cooling loop and the second cooling loop are separated from each other via the integrated device.

18. A cooling system comprising:
a first cooling loop and a second cooling loop configured to circulate a coolant;
an integrated device having a pump and a valve, the integrated device being disposed between the first and second cooling loops and being switchable between a first position and a second position that form different fluid passages between the first and second cooling loops; and
a controller configured to control the integrated device to be placed in the first position or the second position based on a preset condition,
wherein the coolant circulating in the first cooling loop is in a heat exchange relationship with a radiator and power conversion parts of a vehicle, and the coolant circulating in the second cooling loop is in a heat exchange relationship with a battery of the vehicle.

* * * * *